C. A. BARR.
CAR BRAKE.
APPLICATION FILED MAY 11, 1910.

987,534.

Patented Mar. 21, 1911.

Inventor
Charles A. Barr,

Witnesses
J. Crawford
Wm. J. Leath

By Victor J. Evans
Attorney

UNITED STATES PATENT OFFICE.

CHARLES A. BARR, OF LUDLOWVILLE, NEW YORK.

CAR-BRAKE.

987,534.  Specification of Letters Patent.  Patented Mar. 21, 1911.

Application filed May 11, 1910. Serial No. 560,654.

*To all whom it may concern:*

Be it known that I, CHARLES A. BARR, a citizen of the United States, residing at Ludlowville, in the county of Tompkins and State of New York, have invented new and useful Improvements in Car-Brakes, of which the following is a specification.

This invention relates to car brakes, and the object of the invention is to provide a brake operating mechanism capable of being operated by hand either from the top of the car or the sides thereof.

With the above object in view, and others which will appear as the description progresses, the invention resides in the novel construction and combination of parts hereinafter fully described and claimed.

Figure 1:
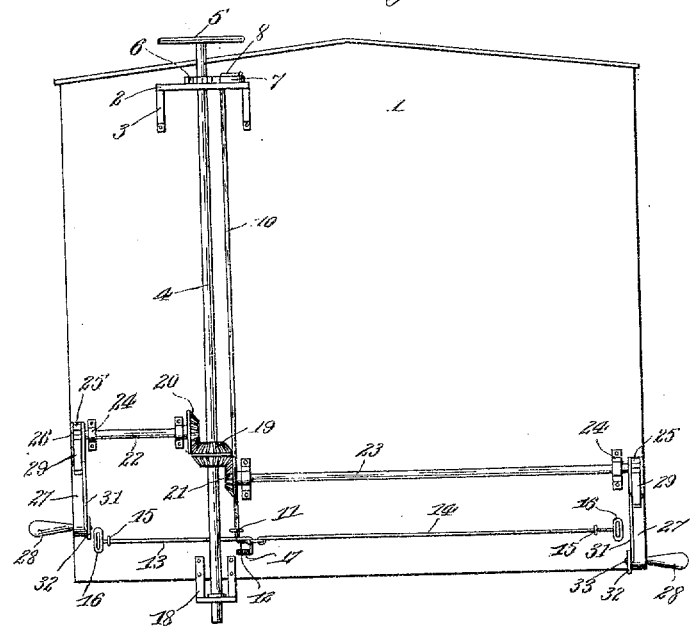
Figure 2:
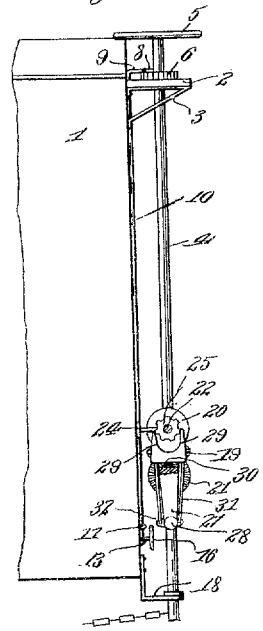
Figures 3, 4:
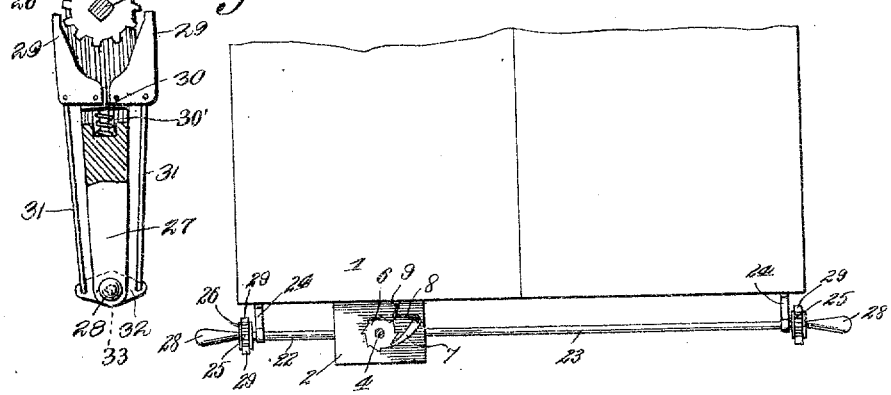

In the accompanying drawings there has been illustrated a simple and preferred embodiment of the improvement, and in which drawings, Figure 1 is a front elevation illustrating the practical application of the invention. Fig. 2 is a side elevation of the same, parts being shown in section. Fig. 3 is a top plan view of the same, the brake shaft being shown in section. Fig. 4 is an enlarged detail view partly in section illustrating the mechanism involving the connection between the toothed wheel and the operating handle.

In the accompanying drawings the numeral 1 designates the end of an ordinary freight car. This car 1 has its rear face or faces provided with a platform 2 which is positioned adjacent the top thereof. This platform is supported by suitable brackets 3, and has an opening adapted for the reception of a brake shaft 4. The brake shaft 4 has its upper extremity provided with a hand wheel 5 and the said shaft is further provided with a ratchet wheel 6. The ratchet wheel 6 normally lies upon the platform 2 and pivotally connected with the said platform is a pawl 7. This pawl 7 has its pivoted end provided with a suitable eye, to which is attached a link 8, and the said link is in turn connected with the offset portion 9 of a vertically arranged rod 10. The rod 10 is mounted in suitable bearings 11 and the said rod has its lower extremity provided with an offset 12. The end of the offset 12 is provided with a suitable eye and connected with this eye are the ends of a pair of operating rods 13 and 14. These rods 13 and 14 extend in opposite directions upon the car, and are each mounted in suitable bearings 15 and have their free ends provided with handles 16.

Secured to the car 1 and connected with the offset or eye of the rod 10 is a helical spring 17. This spring 17 is adapted to exert outward pressure between the offset 12 and the car 1, so as to retain the rods 13 and 14 in proper position when either of the same is slid upon its bearing 15 so as to swing the pawl 7 into engagement with the teeth of the wheel 6 or away from engagement with the teeth of the said wheel.

The lower end of the brake shaft 4 is mounted within a suitable bracket 18, and the end of the shaft extending through the said bracket is provided with a chain or the like, which is connected with the brake beam of the car, not shown. The brake shaft 4 has keyed or otherwise secured thereto a double-faced beveled toothed wheel 19, and adapted to mesh with the opposite faces of the said wheel 19 is a pair of beveled toothed wheels 20 and 21. Both of these toothed wheels 20 and 21 are secured to suitable axles 22 and 23, and the said axles are mounted in suitable bearings 24 provided upon the end of the car. The axles 22 and 23 are each provided with a toothed wheel 25, and loosely mounted upon each of the shafts and adapted to straddle the toothed wheels 25 is a bifurcated extension 26 of an operating lever 27. Each of these levers 27 is provided with offset handles 28 and the said levers are further provided with a pair of oppositely arranged pivoted pawls 29. These pawls are each adapted to be contacted by a flattened spring member 30, the same being retained in the transverse wall provided by the bifurcated portion of the lever 27 and adapted to be contacted and forced into engagement with the pawls by a helical spring 30′. Secured to the lower and outwardly projecting portions of the pawls 29 are rods 31, and the extremities of each of these rods are connected with the ends of a plate 32, the said plate being centrally pivoted with the operating lever 27 as at 33.

From the above description, it will be noted that the brake can be applied from the top or either of the sides of the car, it being merely necessary to throw the pawl out of engagement with the toothed wheels 6, which can be easily accomplished by the operator upon the platform 2 or by the operator upon either of the sides of the car, in the latter instance the pawl being worked through the medium of the operating levers 13 and 14, and by swinging either of the dogs 29 into engagement with the toothed wheels 25 the shaft 4 will be caused to revolve in either direction so as to apply or relieve the brakes as desired.

Having thus fully described the invention, what I claim as new is:—

1. A brake operating means comprising a brake shaft, a double-faced beveled toothed wheel upon the shaft, beveled wheels engaging the faces of the wheel upon the shaft, a shaft for each of these wheels extending in opposite directions, a toothed wheel for each of these shafts, a handle having a bifurcated portion loosely mounted upon each of the shafts and straddling the toothed wheels, a pair of pawls mounted within the bifurcated portion of each of the handles, a plate pivotally connected with each of the handles, each of said plates extending beyond the sides of the handle, and a connection between the ends of the plate and each of the pawls.

2. A brake operating means comprising a brake shaft having a double-faced beveled wheel, a pair of beveled wheels engaging the opposite beveled faces of the wheel upon the shaft, shafts for each of these beveled wheels, toothed wheels for each of the shafts, a handle loosely mounted upon each of the shafts, a pair of spring pressed pawls for both of the handles, means provided upon each of the handles for throwing either of the pawls into engagement with the toothed wheel, a ratchet wheel upon the brake shaft, a pawl for the ratchet wheel, and means arranged at the sides of the car near the lower portion thereof for throwing the pawl into or out of engagement with the ratchet wheel.

3. A brake operating means for cars, comprising a brake shaft, a double faced beveled wheel upon the shaft, beveled wheels engaging the opposite faces of the wheel upon the shaft, shafts for these wheels extending in opposite directions, toothed wheels for the shafts, an operating handle loosely mounted upon each of the shafts, a pair of oppositely arranged spring pressed pawls upon each of the handles, means for throwing either of the pawls into engagement with the toothed wheel, a hand wheel upon the brake shaft, a toothed wheel upon the brake shaft, a pawl for this toothed wheel, a link connected with the pawl, an offset shank connected with the link, and oppositely extending operating bars connected with the rod.

4. In combination with a car, a platform upon the car, an operating shaft extending through the platform, a hand wheel upon the shaft, a ratchet wheel upon the shaft, a pawl pivotally connected with the platform and engaging the ratchet wheel, a link connected with the free end of the pawl, an offset rod connected with the link and projecting downwardly upon the car, bearings for this rod, said rod having its lower extremity provided with an offset, handle members mounted in bearings and arranged in opposite directions connected with the offset of the rod, a spring exerting pressure between the car and the offset portion of the rod, and means connected with the lower end of the car for operating the brake shaft, substantially as and for the purpose set forth.

In testimony whereof I affix my signature in presence of two witnesses.

CHARLES A. BARR.

Witnesses:
GEORGE B. PORTER,
GUS BARNES.

---

Copies of this patent may be obtained for five cents each, by addressing the "Commissioner of Patents, Washington, D. C."